United States Patent [19]
Bhuta et al.

[11] 3,812,454
[45] May 21, 1974

[54] LOW FREQUENCY PARAMETRIC ACOUSTO-OPTICAL IMAGING METHOD AND APPARATUS

[75] Inventors: Pravin G. Bhuta, Torrance; Robert L. Johnson; Robert Aprahamian, both of Marina Del Rey; Jerold L. Jacoby, Lakewood, all of Calif.

[73] Assignee: TRW Inc., Redondo Beach, Calif.

[22] Filed: Jan. 2, 1973

[21] Appl. No.: 319,987

[52] U.S. Cl. ............ 340/3 R, 73/67.5 R, 340/5 MP
[51] Int. Cl. ............................................. G01s 9/66
[58] Field of Search ................. 340/3 R, 5 MP, 5 H; 73/67.5 R, 67.5 H, 67.6, 67.7, 67.8 R, 67.8 S; 332/7.51

[56] References Cited
UNITED STATES PATENTS
3,510,833  5/1970  Turner ........................ 340/5 MP X
3,626,753  12/1971  Aprahamian et al. .......... 340/5 H X Primary Examiner—Richard A. Farley
Attorney, Agent, or Firm—Daniel T. Anderson; Donald R. Nyhagen; Edwin A. Oser

[57] ABSTRACT

An object situated in an acoustic medium, such as water or soil, characterized by relatively high acoustic absorption is optically imaged by a novel acousto-optical imaging technique. Relatively low frequency acoustic waves which are subject to relatively low attenuation by the ambient medium are transmitted through the medium to the object and emanate from the object as distorted acoustic waves containing information defining an image of the object. These distorted acoustic waves are received by an acousto-optical coupling medium which is excited by relatively high frequency and large amplitude acoustic waves. The distorted low frequency acoustic waves and high frequency waves undergo non-linear interaction to produce in the coupling medium resultant acoustic wave sets having frequencies equal to the sum and difference, respectively, of the low and high frequencies and each containing essentially the same image information as the distorted waves. A monochromatic light beam is projected through the coupling medium to impinge the wave fronts of one resultant wave set, preferably the sim wave set, at an oblique angle which causes Bragg diffraction of the light waves by the acoustic waves, such that the light waves emerging from the coupling medium form an optical image of the object.

10 Claims, 2 Drawing Figures

LOW FREQUENCY PARAMETRIC ACOUSTO-OPTICAL IMAGING METHOD AND APPARATUS

RELATED APPLICATIONS

The present U.S. patent application is related to copending applications of the inventors, filed May 30, 1972, Ser. No. 258,057 and entitled "Acousto-Optical Imaging Method and Apparatus" by P. G. Bhuta and R. Aprahamian, and Ser. No. 275,175, filed July 26, 1972, entitled "Acousto-Optical Multi-constituent Flow Monitoring Method and Apparatus" by P. G. Bhuta, R. L. Johnson, D. J. Graham and R. Aprahamian.

BACKGROUND OF THE INVENTION

1. Field of the Invention

This invention relates generally to the field of so-called acousto-optical imaging and more particularly to a novel acousto-optical method and apparatus for optically imaging an object situated in an acoustic medium of relatively high acoustic absorption, such as water or soil. In the context of this disclosure, the expression "high acoustic absorption medium" means a medium which is acoustically dissipative and rapidly attenuates high frequency acoustic waves.

2. Prior Art

The earlier mentioned copending applications and U.S. Pat. No. 3,685,008, as well as certain of the reference cited therein, relate to an optical imaging technique which is referred to herein as acousto-optical imaging. Simply stated, acousto-optical imaging involves transmission or reflection of acoustic waves through or from the object to be imaged to a Bragg cell containing a relatively optically transparent acousto-optical coupling medium referred to herein as a coupling medium, and projection of a substantially monochromatic light beam, such as a coherent laser beam, through the medium. During their propagation through or reflection from the object, the acoustic waves are distorted by the object in such a way as to establish in the distorted waves emanating from the object information defining an image of the object. These distorted acoustic waves then propagate through the coupling medium.

The monochromatic light beam is projected through the coupling medium in such a way that the light wave fronts impinge the distorted acoustic wave fronts at an oblique angle known as the Bragg angle, and the light and sound waves interact according to a phenomenon known as Bragg diffraction. This Bragg diffraction or interaction disperses the light into a carrier and modulated light side bands of different order in each forming an optical image of the object. The image formed by one of the first order side bands may be viewed directly after enlargement by suitable optics or on a television screen. Since this basic acousto-optical imaging technique is well understood by those versed in the art and explained in detail in the earlier mentioned references, no further elaboration on the subject is needed in this disclosure.

This invention is concerned with a problem which is encountered when the object to be imaged is situated in an ambient medium, such as water or soil, which is characterized by high acoustic absorption. In this situation, acousto-optical imaging presents two conflicting requirements. Thus, owing to the high acoustic absorption of the ambient medium, the probing acoustic wave energy utilized to acoustically "illuminate" the object must be of relatively low frequency, on the order of a few KHz, to avoid excessive attenuation of the acoustic waves transmitted through the medium to the object and returned from the object to the coupling medium. Relatively high frequencies, of course, would suffer such severe attenuation as to preclude imaging of an object more than a few feet from the acoustic source. On the other hand, acoustic deflection of the light in the coupling medium is a function of the frequency of the acoustic waves which interact with the light waves. If this acoustic frequency is relatively low, as required for effective acoustic wave transmission through the ambient medium containing the object to be examined, it is not possible to isolate, i.e., separate from the light carrier, the modulated light side band to be used for imaging. Effective detection or separation of a side band for imaging requires a relatively high acoustic frequency on the order of 100 Kilohertz or higher.

Hence the conflicting requirements; a relatively low acoustic probing frequency for acoustically "illuminating" the object to be imaged and a relatively high acoustic frequency for isolation of a modulated side band for imaging.

The earlier mentioned U.S. Pat. No. 3,685,008 describes one technique for solving the above problem. Simply stated, this technique involves the use of suitably low frequency probing acoustic waves for illuminating the object and increasing, by an acoustic wave front reconstruction process, the frequency of the distorted acoustic waves from the object to the higher frequency required for isolation of a modulated light side band for imaging.

SUMMARY OF THE INVENTION

This invention provides an improved acousto-optical imaging method and apparatus which utilizes a simplified technique for satisfying the two conflicting requirements involved in imaging an object situated in a high acoustic absorption medium, such as water or soil. According to the invention, relatively low frequency, i.e., few KHz, acoustic probing waves are utilized for transmission through the medium to acoustically illuminate the object. The distorted acoustic waves emanating from the object and containing information defining an image of the object are received by a Bragg cell containing an acousto-optical coupling medium. To this extent, therefore, the invention utilizes the prior known imaging technique.

In contrast to the prior technique, however, the present invention contemplates separate excitation of the Bragg medium by relatively high frequency acoustic energy, referred to herein as pumping energy, having a frequency on the order of that required for effective imaging sideband isolation, i.e., 100 Kilohertz or more. The acoustic pumping transducer is driven with a power level of approximately 100 to 110 db to excite the coupling medium with large amplitude high frequency acoustic waves.

These high frequency large amplitude acoustic waves and the low frequency distorted acoustic waves from the object being imaged undergo non-linear interaction. This non-linear interaction produces in the coupling medium resultant acoustic wave sets having frequencies equal to the sum and difference, respectively, of the high pumping frequency and low probing frequency.

A monochromatic light beam from a laser or other source is projected through the coupling medium to impinge the wavefronts of one resultant wave set at the Bragg angle. Accordingly, the acoustic waves of this wave set produce Bragg diffraction of the light waves into a light carrier and modulated sidebands, one of which is used for imaging.

DESCRIPTION OF THE PREFERRED EMBODIMENTS

Figure 1:
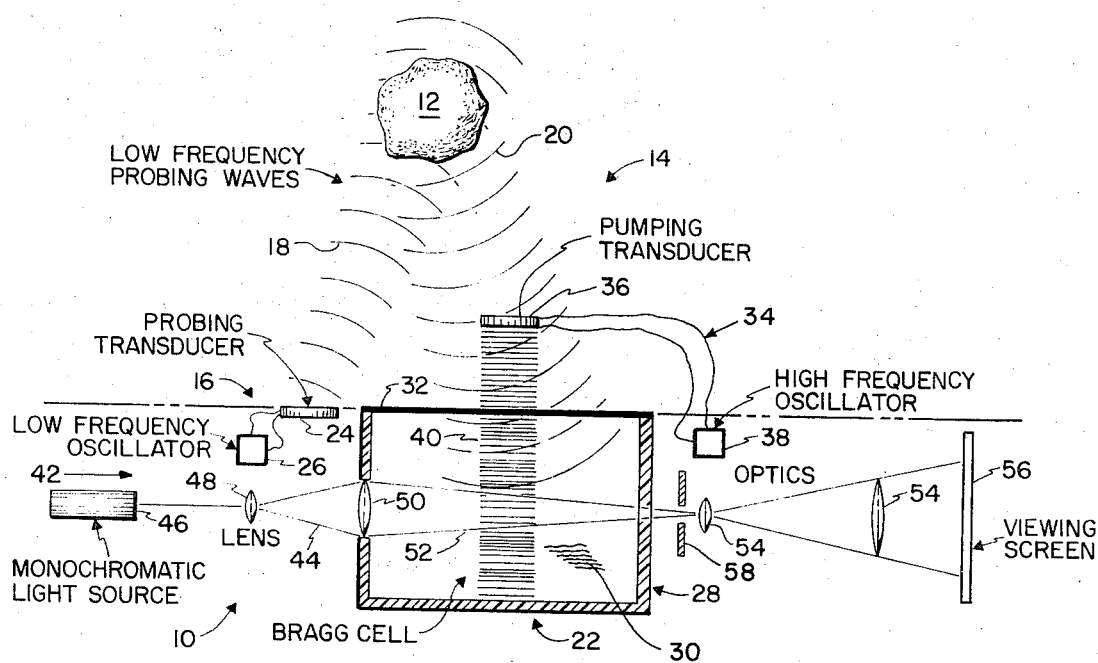
FIG. 1 illustrates an acousto-optical imaging apparatus according to the invention which utilizes reflected acoustic probing waves for imaging.

Referring first to FIG. 1, there is illustrated an acousto-optical imaging apparatus 10 according to the invention for imaging an object 12 situated in an ambient medium 14. The imaging apparatus has an acoustic source 16 for transmitting acoustic waves 18, referred to herein as probing waves, through the medium 14 to the object 12. These probing waves are distorted by the object, such that the acoustic waves 20 emanating or emerging from the object are distorted waves which contain information defining an image of the object. Distorted waves 20 are received by a Bragg diffraction imaging means 22 which transforms the image information in the waves to an optical image of the object 12, as explained below.

Figure 2:
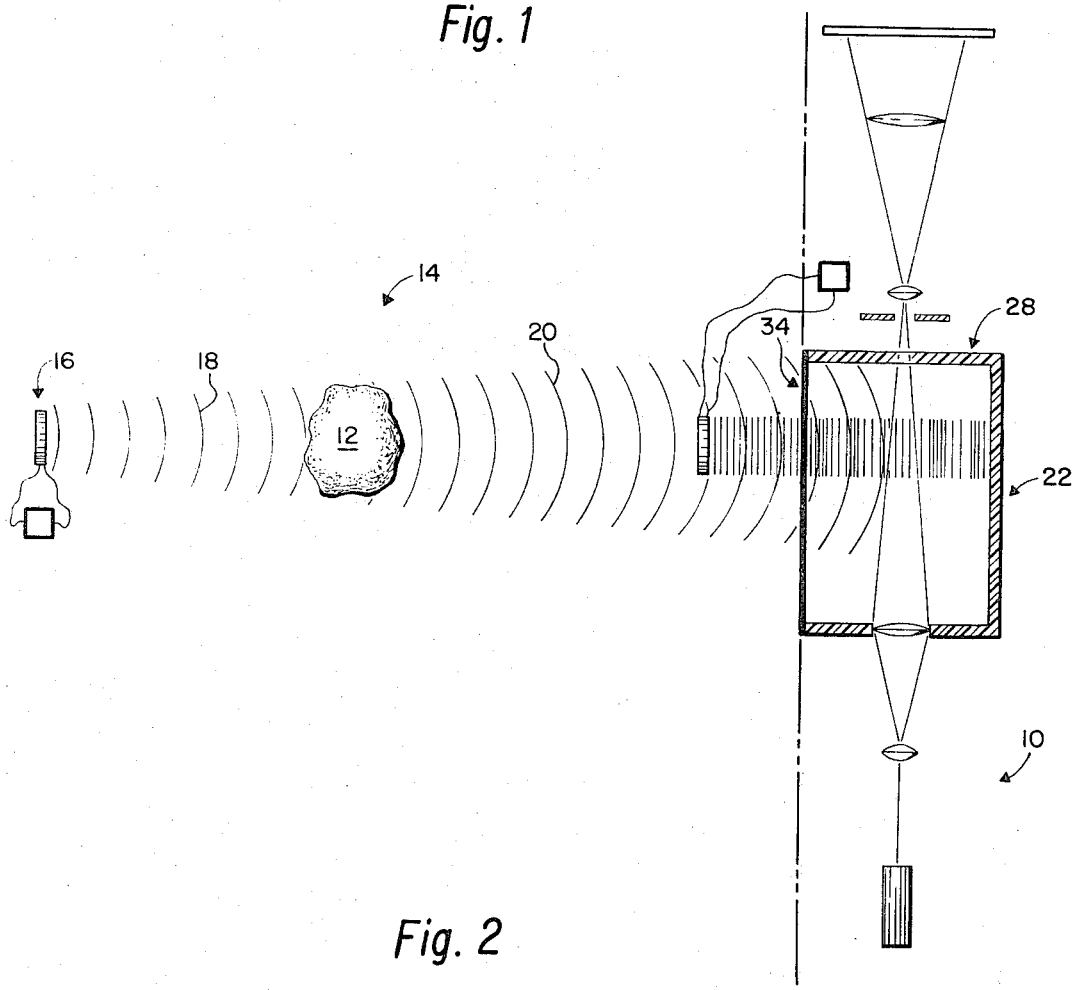
FIG. 2 illustrates a modified imaging apparatus which utilizes transmitted acoustic probing waves for imaging.

As noted earlier, the present acousto-optical imaging invention may be utilized to image an object by reflection of the acoustic probing waves from the object or transmission of the probing waves through the object. The particular imaging apparatus 10 shown in FIG. 1 is an echo-imaging apparatus which employs the echo-imaging concept described in U.S. Pat. No. 3,685,008 to image the object 12 by deflection of the probing waves 18 from the object to the Bragg diffraction imaging means 22. FIG. 2, described later, shows an imaging system according to the invention for imaging by transmission of the probing waves through the object.

This invention is concerned primarily with the problem of acousto-optically imaging an object 12 situated in an ambient medium 14 of relatively high acoustic absorption. Examples of such media are water and soil. As noted earlier, imaging under these conditions presents two conflicting requirements, namely, (1) the use of a relatively low acoustic probing frequency to avoid excessive attenuation of the acoustic probing waves 18 and distorted waves 20 by the ambient medium 14 and thereby permit imaging of an object located a substantial distance from the acoustic source 16 and imaging means 22, and (2) excitation of the Bragg diffraction imaging means 22 by distracted acoustic wave energy of relatively high frequency to permit isolation of a modulated light side band for imaging.

According to the invention, these two conflicting requirements are satisfied by utilizing a probing acoustic source 16 of the low constant frequency and amplitude required for relatively long range transmission of the probing waves 18 through the particular ambient medium 14 involved. In the case of water, for example, this probing frequency is on the order of few KHz. To this end, the probing acoustic source 16 comprises an acoustic transducer 24 which is acoustically coupled to the ambient medium and a driver or oscillator 26 for driving the transducer 24 at the proper low frequency to launch the probing acoustic waves 18 through the medium toward the object 12.

The Bragg diffraction imaging means 22 comprises a Bragg cell 28 containing an acoustic wave transmission medium 30, referred to herein as an acousto-optical coupling medium or simply coupling medium, such as water. Coupling medium 30 is acoustically coupled to the ambient medium 14 to receive the distorted acoustic probing waves 20 from the object 12. This acoustic coupling may be accomplished, for example, by utilizing as one wall 32 of the Bragg cell 28 an acoustic transmission member, such as an elastic membrane, having its outer surface in contact with the ambient medium 14 and its inner surface in contact with the coupling medium 30. It will be understood, therefore, that the low frequency distorted probing waves 20 from the object 12 are received by the Bragg cell 28 and propagate through its acoustic transmission wall 32 into the coupling medium 30.

The imaging means 22 includes a constant, relatively high frequency acoustic source 34, referred to herein as a pumping source. This acoustic pumping source generates in the coupling medium 30 relatively high frequency acoustic pumping waves whose frequency is on the order, i.e., 100 Kilohertz or higher, of that required for isolation a modulated light side band for imaging by Bragg diffraction. This acoustic source includes an acoustic transducer 36 acoustically coupled to the coupling medium 30 and a driver or oscillator 38 for driving the transducer at the proper high frequency and with a relatively large constant amplitude, as explained below.

From the description to this point, it is evident that during operation of the acousto-optical imaging apparatus 10, the low frequency acoustic probing waves 18 are transmitted through the ambient medium 14 to the object 12 and are reflected from the object as the distorted acoustic waves 20. These distorted waves contain information defining an image of the object 12 and propagate through the ambient medium to the Bragg cell 28 and through the cell wall 32 into the coupling medium 30. The high frequency pumping acoustic source 34 generates high frequency large amplitude pumping acoustic waves in the coupling medium. The amplitude of these high frequency pumping waves is such as to effect non-linear interaction within the coupling medium of the latter waves and the low frequency distorted probing waves from the object 12.

The phenomenon of non-linear interaction of acoustic waves is well understood by those versed in the art and explained in published texts on the subject and hence will not be elaborated on in this disclosure. Suffice it to say that non-linear interaction of the low frequency distorted probing waves 20 from the object 12 and the high frequency pumping waves from the pumping source 34 produces resultant acoustic wave sets 40 having frequencies equal to the sum and difference, respectively, of the high and low frequencies. Each of these resultant wave sets contains essentially the same image information concerning the object 12 as the distorted waves 20 arriving at the Bragg cell 28. The resultant wave sets propagate downwardly (as viewed in FIG. 1) through the coupling medium 30.

The image information contained in one of the resultant wave sets 40 is transformed by Bragg diffraction to a corresponding optical image of the object 12. To this end, the Bragg imaging means 22 has a means 42 for projecting a substantially monochromatic light beam 44 through the coupling medium 30 across the propagation path of the resultant wave sets 40 through the medium. Beam projection means 42 comprises a substantially monochromatic light source 46, in this instance, a laser, located externally of the Bragg cell 28. Located in the path of the beam are a diverging lens 48 which expands the beam and a diverging lens 50 mounted in a wall opening in the Bragg cell 28 which forms the beam into a cone 52 that propagates through the coupling medium 30 and across the propagation path of the resultant wave sets 40. The beam emerging from the Bragg cell passes through objective optics 54 to a viewing screen 56.

Beam 44 is projected through the coupling medium 30 in such a way that the light wave fronts impinge the wave fronts of one selected resultant wave set 40, preferably the sum wave set, i.e., the wave set whose frequency is the sum of the high and low pumping and probing frequencies, at the Bragg angle. The light waves then undergo Bragg diffraction by the acoustic waves of the selected wave set and the light emerging from the Bragg cell contains a modulated first order side band which defines or forms an optical image corresponding to the image information in the selected wave set and hence the distorted probing waves 20. This side band is isolated by a mask 58 which blocks the light carrier and other side bands and the isolated side band image is enlarged and projected onto the viewing screen 56 by the optics 54.

As noted earlier, the underlying principles of imaging by Bragg diffraction of light waves by acoustic waves are well known and understood and are explained in some detail in the prior art publications cited earlier. Accordingly, it is unnecessary to elaborate on the subject here. Suffice it to say that the acoustic pumping frequency of the pumping source 34 is made sufficiently high that the frequency of the resultant acoustic wave set 40 selected for imaging by Bragg diffraction is high enough, i.e., 100 Kilohertz or more, to permit isolation of the modulated light side band used for imaging.

It is worthy of note here that the tapered light cone 52 which traverses the resultant wave sets 40 improves the intensity and quality of the image for the reasons explained in U.S. Pat. No. 3,685,008. As further explained in the latter patent imaging may be carried out in either the Bragg regime or Sears-Debye regime.

FIG. 2 illustrates the invention as utilized to image an object 12 by transmission or propagation of the acoustic probing waves 18 through the object rather than by reflection from the object. The construction and operation of the acousto-optical imaging apparatus 10 is the same as in FIG. 1, except that the Bragg cell 28 receives the distorted acoustic probing waves 20 after their propagation through the object 12 rather than after reflection from the object, as in FIG. 1.

What is claimed as new in support of letters patent is:

1. The acousto-optical method of imaging an object situated in a relatively high acoustic absorption medium, comprising the steps of:

transmitting relatively low frequency acoustic waves through said medium to said object, whereby the acoustic waves emanate from the object as distorted acoustic waves containing information defining an image of the object, receiving said distorted waves in an acoustic-optical coupling medium, exciting said coupling medium with relatively high frequency and large amplitude acoustic waves in such a way as to effect non-linear interaction of said distorted waves and high frequency waves and produce in said coupling medium resultant acoustic wave sets having frequencies equal to the sum and difference, respectively, of said low and high frequencies and each containing essentially the same image information as said distorted waves, and projecting a substantially monochromatic light beam through said coupling medium to impinge the wave fronts of one of said resultant wave sets at an oblique angle such that the light waves are Bragg diffracted by the acoustic waves of said one wave set and the light waves emerging from said coupling medium form an optical image of said object.

2. The imaging method of claim 1 wherein:

said one wave set is the sum wave set.

3. The imaging method of claim 1 wherein:

said low frequency waves are reflected from said object to said coupling medium.

4. The method of claim 1 wherein:

said low frequency waves are transmitted through said object to said coupling medium.

5. The imaging method of claim 1 wherein:

said low frequency waves have a frequency on the order of a few Kilohertz.

6. Acousto-optical apparatus for imaging an object situated in a relatively high acoustic absorption medium, comprising:

means transmitting relatively low frequency acoustic waves through said medium to said object, whereby the acoustic waves emanate from the object as distorted acoustic waves containing information defining an image of the object, an acousto-optical coupling medium for receiving said distorted waves, means for exciting said coupling medium with relatively high frequency and large amplitude acoustic waves in such a way as to effect non-linear interaction of said distorted waves and high frequency waves and produce in said coupling medium resultant acoustic wave sets having frequencies equal to the sum and difference, respectively, of said low and high frequencies and each containing essentially the same image information as said distorted waves, and means for projecting a substantially monochromatic light beam through said coupling medium to impinge the wave fronts of one of said resultant wave sets at an oblique angle such that the light waves are Bragg diffracted by the acoustic waves of said one wave set and the light waves emerging from said coupling medium form an optical image of said object.

7. Acousto-optical imaging apparatus according to claim 6 wherein:

said one wave set is the sum wave set.

8. Acousto-optical imaging apparatus according to claim 6 wherein:
   said low frequency waves are reflected from said object to said coupling medium.

9. Acousto-optical imaging apparatus according to claim 6 wherein:
   said low frequency waves are transmitted through said object to said coupling medium.

10. Acousto-optical imaging apparatus according to claim 6 wherein:
    said low frequency waves have a frequency on the order of a few Kilohertz.

* * * * *